July 30, 1940.　　　　J. H. VICTOR　　　　2,209,750
FLUID SEAL WITH SPONGY PACKING
Filed Aug. 7, 1937
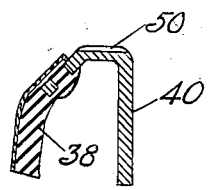
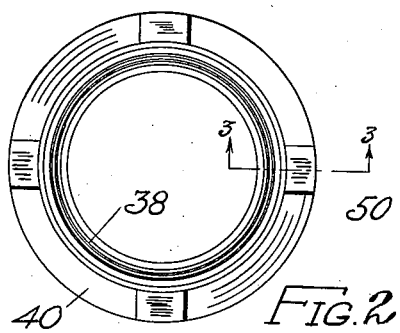
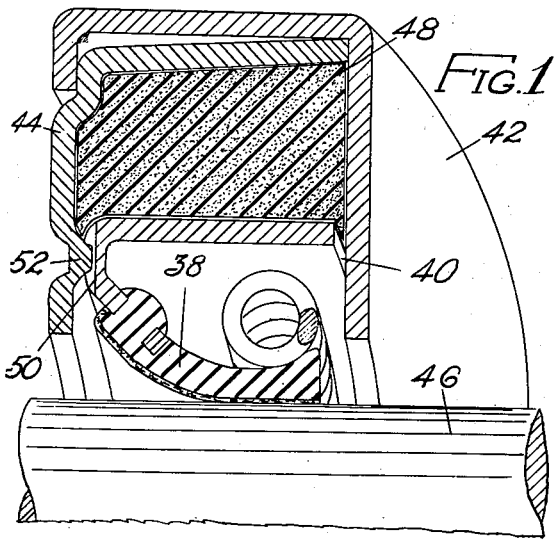
JOHN H. VICTOR
INVENTOR
PER
ATTORNEY Patented July 30, 1940

2,209,750

UNITED STATES PATENT OFFICE 2,209,750

FLUID SEAL WITH SPONGY PACKING

John H. Victor, Wilmette, Ill., assignor to Victor Manufacturing & Gasket Company, Chicago, Ill., a corporation of Illinois Application August 7, 1937, Serial No. 157,878

2 Claims. (Cl. 288—3)

This invention relates to an improved fluid seal and has, for one of its principal objects, the provision of a device adapted for maintaining certain fluids, particularly oils and greases in housings having rotating shafts and has, for one of its principal purposes, the provision of a simple yet efficient apparatus of this type.

Another object of the invention is to provide a fluid seal having a flexible sealing element which is supplemented or reinforced by some resilient means, as, for example, sponge rubber or possibly a metallic spring of helical or other shape.

Another and further important object of the invention is the provision, in a fluid seal of the class described, of means for more or less loosely supporting a flexible sealing element in what might be termed a floating position while, at the same time, there is afforded an adequate protection against any possibility of leakage between the related parts.

A further object is to provide a sealing element made in two complementary halves whereby the same can be readily placed in position about a shaft and into the corresponding half portions of a housing structure which encompasses or encircles the shaft.

Another and still further important object of the invention is the provision in a fluid seal of flexible sealing elements which can be made on a production basis to fit a certain size of shaft and which can be associated with supporting shells or containers of various sizes whereby housings of different dimensions can be readily accommodated.

Other and further important objects of the invention will be apparent from the disclosures in the accompanying drawing and following specification.

The invention, in a preferred form, is shown in the drawing and hereinafter more fully described.

In the drawing:

Figure 1 is an enlarged view, partly in section, of an improved fluid seal constructed in accordance with the principles of this invention.

Figure 2 is a plan view of the sealing element of Figure 1, showing the same as removed from the containing shell but associated with its metal support.

Figure 3 is a sectional view taken on the line 3—3 of Figure 2, looking in the direction indicated by the arrows.

As shown in the drawing:

A form of the invention is illustrated in Figures 1, 2 and 3 wherein the flexible sealing element 38 is composed of synthetic rubber or the like molded during the process of manufacture to a metallic support 40 which is shaped as shown. This, in turn, is inserted into a support composed of a pair of interfitting shells 42 and 44, the space between the element 40 and the shell 44 being variable to accommodate different sizes of housings into which the shaft 46 may be inserted, and this space is filled with sponge rubber or the like 48.

It will be noted that the diaphragm 38 and its attached support 40 are rather loosely mounted in the shells 42 and 44, and in order to prevent relative rotation between the parts, a plurality of slots or notches 50 are formed in the outer face of the metal support 40 as best shown in Figures 5 and 6. Inwardly struck lugs 52 are fashioned in the shell 44, these fitting into the notches 50 whereby a floating but nonrotatable reception of the sealing element in the shell is assured. At the same time, the sponge rubber or other packing 48 provides a structure which is proof against leakage around and about the associated metal parts.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A fluid seal, including a flexible packing element, a supporting washer to which the same is fastened, and means for loosely but non-rotatably maintaining the washer in desired position with respect to a housing, said means including a pair of interfitting and interlocked shells surrounding and enclosing the washer in radially spaced relationship thereto, and an auxiliary sealing element confined in the space between the washer and the shells.

2. A fluid seal, including a flexible packing element, a supporting washer to which the same is fastened, and means for loosely but non-rotatably maintaining the washer in desired position with respect to a housing, said means including a pair of interfitting shells surrounding and radially spaced from the washer, and an auxiliary sealing element in the space between the washer and the shells, said auxiliary sealing element comprising an annulus of sponge rubber under compression.

JOHN H. VICTOR.